(12) United States Patent
Capriotti et al.

(10) Patent No.: US 9,003,745 B2
(45) Date of Patent: Apr. 14, 2015

(54) WORKING STATION WITH A CUTTING TOOL FOR QUICKLY CUTTING A WIDTH OF FILM

(75) Inventors: Luciano Capriotti, Bad Groenenbach (DE); Lars Ickert, Kempten (DE)

(73) Assignee: Mutlivac Sepp Haggenmueller GmbH & Co. KG, Wolfertschwenden (DE)

( * ) Notice: Subject to any disclaimer, the term of this patent is extended or adjusted under 35 U.S.C. 154(b) by 642 days.

(21) Appl. No.: 13/336,440

(22) Filed: Dec. 23, 2011

(65) Prior Publication Data
US 2012/0159901 A1 Jun. 28, 2012

(30) Foreign Application Priority Data

Dec. 23, 2010 (DE) .......................... 10 2010 055 967

(51) Int. Cl.

| | |
|---|---|
| B65B 7/00 | (2006.01) |
| B65B 51/10 | (2006.01) |
| B65B 9/067 | (2012.01) |
| B65B 61/06 | (2006.01) |
| B65B 7/16 | (2006.01) |
| B26D 5/08 | (2006.01) |
| B26F 1/40 | (2006.01) |
| B29C 65/74 | (2006.01) |
| B29C 65/00 | (2006.01) |

(52) U.S. Cl.
CPC ................ *B65B 7/164* (2013.01); *B26D 5/086* (2013.01); *B26F 1/40* (2013.01); *B29C 65/7451* (2013.01); *B29C 66/112* (2013.01); *B29C 66/131* (2013.01); *B29C 66/53461* (2013.01); *B29C 66/8161* (2013.01); *B29C 66/8244* (2013.01); *B29C 66/8322* (2013.01); *B29C 66/849* (2013.01); *B65B 61/065* (2013.01)

(58) Field of Classification Search
CPC .......... B65B 7/00; B65B 51/10; B65B 9/067; B65B 61/06
USPC ....................... 53/285, 329.2–329.5
See application file for complete search history.

(56) References Cited

U.S. PATENT DOCUMENTS 2,700,827 A * 2/1955 Rowe et al. ..................... 33/636
4,982,555 A * 1/1991 Ingemann ....................... 53/405
(Continued)

FOREIGN PATENT DOCUMENTS

DE 102008032306 A1 1/2010

OTHER PUBLICATIONS

German Office Action Dated Nov. 8, 2011, Application No. 102010055967.9, Applicant MULTIVAC Sepp Haggenmueller GmbH & Co. KG, 5 Pages.

*Primary Examiner* — Michelle Lopez
(74) *Attorney, Agent, or Firm* — Husch Blackwell LLP

(57) ABSTRACT

A working station for a packaging machine for sealing a package and quickly cutting a top film and a method for operating such a working station. The working station may include a sealing tool upper part, a sealing tool lower part, a sealing frame, a movable cutting tool having a blade for cutting a top film, and at least one energy storage device in operable engagement with the cutting tool and the sealing frame. The at least one energy storage device may be configured for accumulating potential energy upon a relative movement of the sealing frame with respect to the cutting tool. The working station may further include a holding mechanism that is operable to hold the cutting tool to a portion of the working station that is stationary with respect to the cutting tool and the sealing frame.

20 Claims, 7 Drawing Sheets

(56) References Cited

U.S. PATENT DOCUMENTS

| | | |
|---|---|---|
| 6,351,928 B2 * | 3/2002 | Torre ............................. 53/556 |
| 6,691,490 B1 * | 2/2004 | Yuyama et al. ............. 53/131.4 |
| 2004/0098947 A1 | 5/2004 | Konishi |
| 2006/0048480 A1 | 3/2006 | Konishi |
| 2009/0272075 A1 * | 11/2009 | Biechteler ...................... 53/285 |
| 2012/0151875 A1 * | 6/2012 | Capriotti et al. ................ 53/285 |
| 2012/0324835 A1 * | 12/2012 | Ickert et al. .................... 53/476 |

* cited by examiner

WORKING STATION WITH A CUTTING TOOL FOR QUICKLY CUTTING A WIDTH OF FILM

CROSS-REFERENCE TO RELATED APPLICATIONS

This application claims foreign priority benefits under 35 U.S.C. §119(a)-(d) to German patent application number DE 10 2010 055 967.9, filed Dec. 23, 2010 which is incorporated by reference in its entirety.

TECHNICAL FIELD

The disclosure relates to a working station as well as to a method for operating such a working station for cutting a width of film.

BACKGROUND

Known from DE 10 2008 032 306 A1 is a tray sealing machine with a working station that comprises a sealing tool for sealing trays with a top film and a cutting tool for cutting the top film. An electric motor drive is provided for moving the sealing tool and the cutting tool. The cutting tool can be moved relative to the sealing tool and to a chamber upper part or to the tray that is to be sealed.

The speed of the movement of the cutting tool with respect to the top film that is to be cut is low, because the electric motor drive has a spindle that is designed for producing high forces. The cutting of flexible films that have, for example, a thickness of less than 50 µm or that have been heated for skinning does not lead to a visually appealing film edge, in spite of the use of serrated blade edges.

SUMMARY

The object of the present disclosure is therefore to provide a working station for a packaging machine whereby this working station has improved and yet economical cutting.

The working station is especially suitable for a small table tray sealer in which the tray is to be inserted into a drawer.

The working station for a packaging machine according to the disclosure for sealing trays comprises a sealing tool upper part, a sealing tool lower part, a sealing frame, a cutting tool and a blade for cutting a width of film, wherein the blade is provided on the cutting tool and the blade is adapted to an edge of the tray. At least one energy storage device is provided between the cutting tool and the sealing frame in order to have potential energy accumulated after a relative movement of the sealing frame with respect to the cutting tool. The movement of the sealing frame and the subsequent cutting movement of the cutting tool are consequently made possible by only one drive, consequently simplifying the design of the working station. The energy storage device is preferably a spring, preferably a compression spring. This allows an economical and space-saving design. Alternatively, correspondingly acting elements in which a medium is expandable or compressible can be used.

In a preferred form, at least one holding means is provided in order to hold temporarily the cutting tool on a part of the working station that is stationary with respect to the cutting tool and the sealing frame, preferably on the sealing tool upper part. The increase in the spring force of the spring element is consequently brought about and the detachment of the cutting tool from the holding element is controlled.

The holding means is preferably a permanent magnet or an electromagnet, preferably a pot magnet, because the pot magnet has a low magnetic stray field.

The detachment of the cutting tool from the holding means is preferably provided by means of switching off the electromagnet by means of a controller or by means of exceeding the retention force of the holding means by the sealing frame and the energy storage device, preferably a compression spring. The detachment of the cutting tool from the holding means is likewise conceivable by means of a limit stop or a stroke limitation that is provided between the sealing frame and the cutting tool in order to limit the relative movement.

Preferably at least one cushioning element is provided in order to cushion the impact of the cutting tool on the sealing frame. This protects the affected components that impact against one another at the end of the cutting movement.

In the case of a method according to the disclosure for operating a working station for a packaging machine for sealing trays and for cutting a top film, a sealing frame executes a relative movement with respect to a cutting tool and consequently loads at least one energy storage device (or energy accumulation device).

A spring is preferably tensioned during this process. As a result, only one drive is needed that moves the sealing frame, because the cutting movement of the cutting tool is executed via the energy storage device or the spring quickly and independently of the movement of the sealing frame, above all much faster than the drive of the sealing frame would allow.

Preferably a holding means holds the cutting tool on a part of the working station that is stationary with respect to the cutting tool and the sealing frame, preferably on the sealing tool upper part, and the cutting tool is let loose and quickly moves in the direction of the top film. This fast movement results in an improved cutting result.

Preferably a blade mounted on the cutting tool cuts the top film on an edge of the tray in order to obtain the smallest possible overlap of the cut top film with respect to the tray edge.

Preferably the cutting tool is cushioned by means of at least one cushioning element at the end of the cutting movement in order to brake the cutting tool harmlessly and in order to avoid a negative influence on the sealing.

In the following, an advantageous embodiment of the thermoforming machine according to the disclosure and of the method according to the disclosure is described in more detail with reference to the below drawings.

DETAILED DESCRIPTION

Components that correspond to one another are consistently given the same reference numbers in the figures.

In the following, an embodiment of the disclosure is described with reference to FIG. 1 to FIG. 7, taking as an example a single-use tray sealing machine or a table tray sealer.

Figure 1:
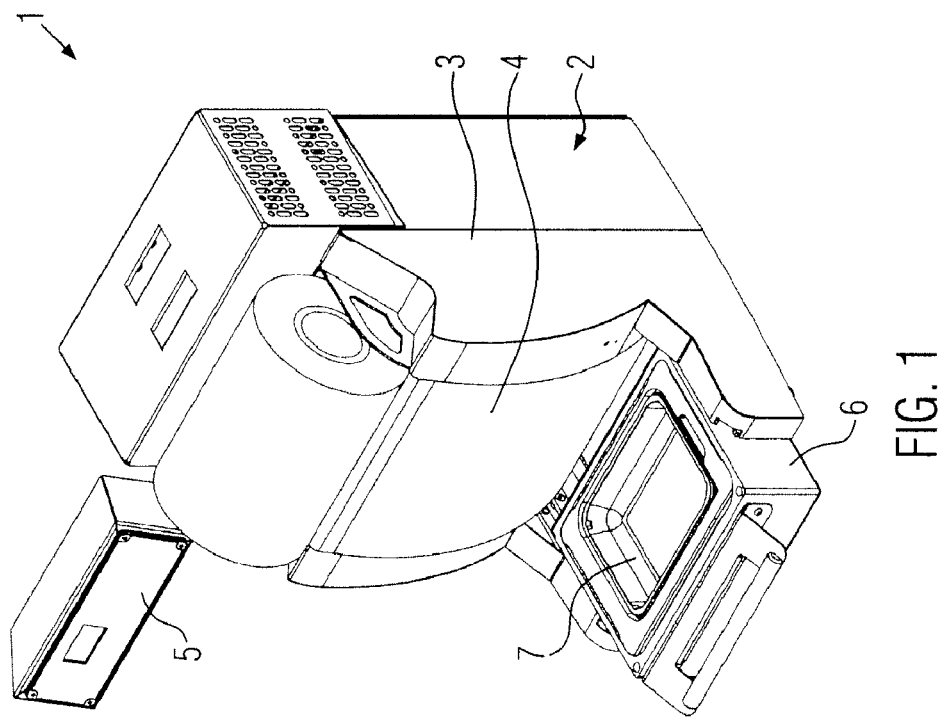
FIG. 1 is a schematic view of a packaging machine according to the present disclosure.

FIG. 1 shows the table tray sealer 1 as a packaging machine with a working station 2, a top film guide 3 for a top film 4 and a display and control device 5 that controls the operation of the table tray sealer 1. The table tray sealer 1 has a drawer 6 that simultaneously serves as a sealing tool lower part 6 and a chamber lower part 6. A tray 7 filled with product 8 (see FIG. 2) is placed into the drawer 6 or into the sealing tool lower part 6 and manually slid into the working station 2.

Figure 2:
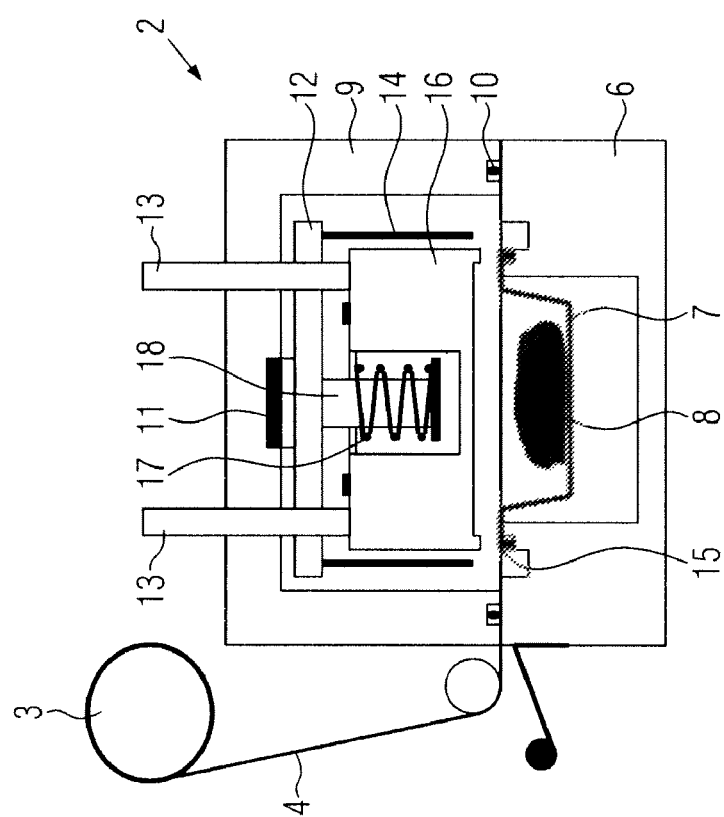
FIG. 2 is a schematic sectional view of a working station according to the present disclosure in the initial position.

FIG. 2 shows a schematic sectional view of a working station 2 according to the disclosure in an initial position. After the sealing tool lower part 6 is slid in, the top film 4 is clamped together between the sealing tool lower part 6 and a sealing tool upper part 9 by means of a seal 10 running around the circumference in such a way that a chamber that can be evacuated results.

An electromagnet 11 that holds a cutting tool 12 is mounted on the sealing tool upper part 9. The cutting tool 12 can be moved relative to the sealing tool upper part 9 over guides 13. A blade 14 is mounted on the cutting tool 12, wherein the contour of this blade essentially corresponds to the edge 15 of the tray 7. A sealing frame 16 can be moved relative to the sealing tool upper part 9 over guides 13. A compression spring 17 is provided between the cutting tool 12 and the sealing frame 16 in such a way that the compression spring 17 tenses against a bolt 18 during a sealing movement of the sealing frame 16 in the direction of the clamped top film 4 and the tray 7, whereby this bolt is in turn connected to the cutting tool 12.

Figure 3:
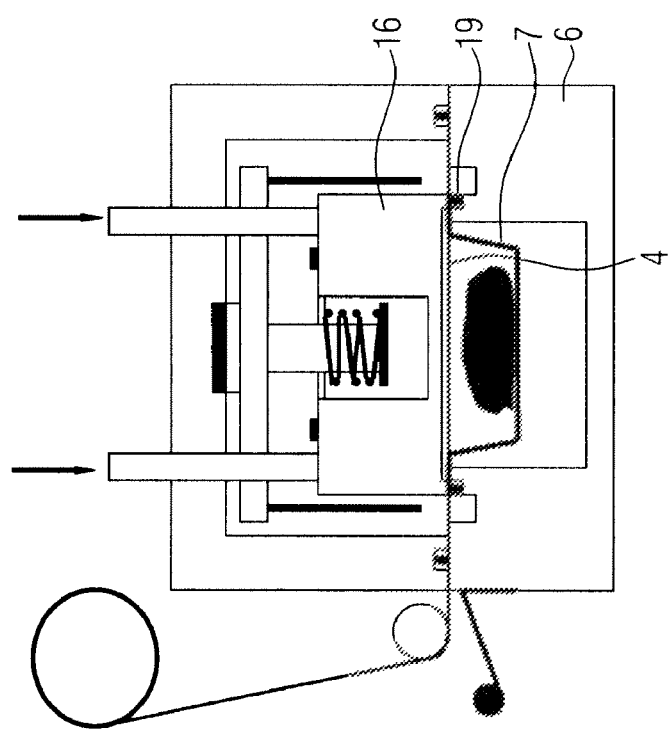
FIG. 3 is a schematic sectional view with a tensioned compression spring.

In FIG. 3, the sealing frame 16 has been moved down via a drive that is not shown, and the sealing frame clamps the top film 4 and the tray 7 against the sealing tool lower part 6 via a sealing gasket 19. This tensions the compression spring 17. The retention force of the electromagnet 11 is thereby greater than the force of the tensioned spring 17.

Figure 4:
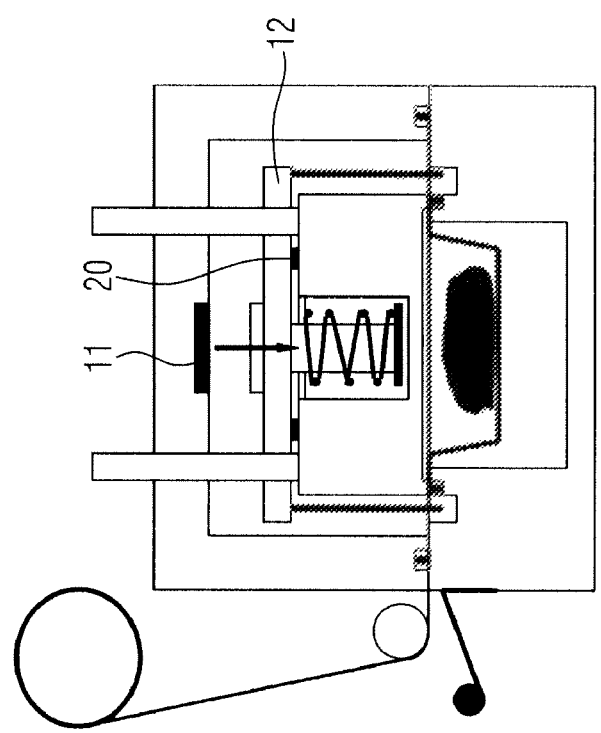
FIG. 4 is a schematic sectional view after a cutting process.

FIG. 4 shows the cutting tool 12 after the holding magnet 11 has released the cutting tool 12 by means of the controller 5 and the tensioned compression spring 17 has moved the cutting tool 12 downwards at a very high speed by means of the bolt 18. The cutting tool 12 is preferably provided with a low weight in order to have a low inertia in order to achieve a high acceleration. A high speed of the blade 14 leads to very good cutting results and a visually appealing edge of the cut top film 4 on the tray 7.

At least one cushioning element 20 causes the cutting tool 12 not to impact, without braking, against the sealing frame 16 after the cutting of the top film 4. For example, the cushioning element 20 is made of silicone and mounted circularly on the sealing frame 16 or on the cutting tool 12. In a variant that is not shown, the electromagnet 11 can be replaced by a permanent magnet. The force for detaching the cutting tool 12 from the sealing tool upper part 9 can be applied both by tensioning the spring 17 on the block and a still further movement of the sealing frame 12 downwards, and also by achieving the detachment force by tensioning the spring 17 shortly before or at the moment of the clamping of the top film 4 between the sealing frame 12 and the sealing tool lower part 6. In an advantageous manner, the impact, at least for a short time, increases the force of the sealing frame 16 on the top film 4 and the tray 7 without thereby negatively influencing the sealing.

Figure 5:
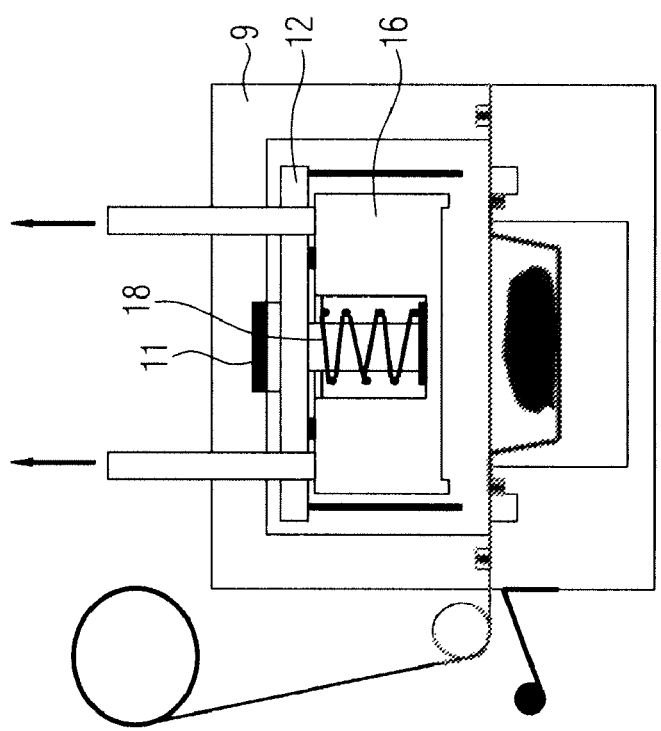
FIG. 5 is a schematic sectional view with the cutting tool on the holding element.

FIG. 5 shows the position of the cutting tool 12 after the cutting tool 12 has been raised upwards against the electromagnet 11 by a movement of the sealing frame 16 and the electromagnet 11 has been activated via the controller 5, in order to hold the cutting tool 12 on the sealing tool upper part 9. The sealing frame 16 thereby raises the cutting tool 12 via the bolt 18.

Figure 6:
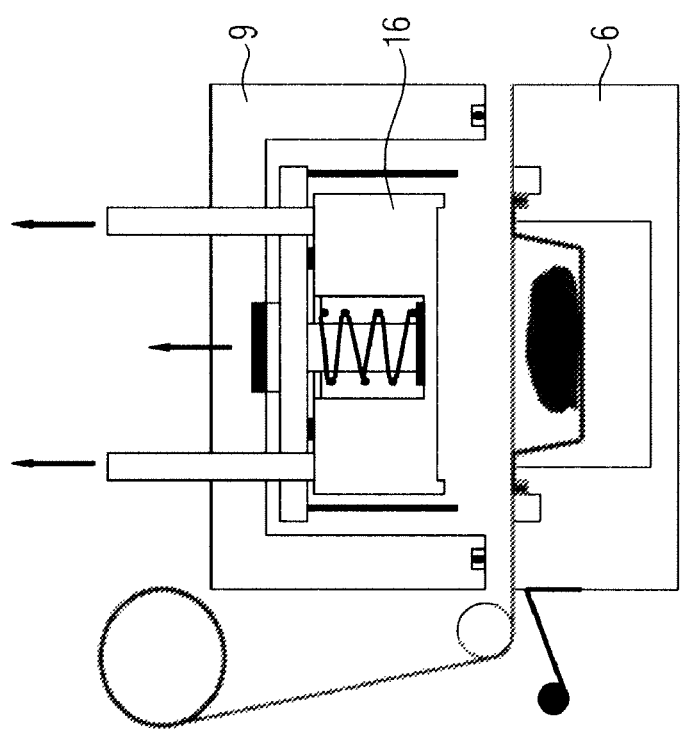
FIG. 6 is a schematic sectional view with raised sealing tool upper part.

The sealing frame 16 and the sealing tool upper part 9 then move further upwards, as shown in FIG. 6, in order to release the drawer 6 for extraction.

Figure 7:
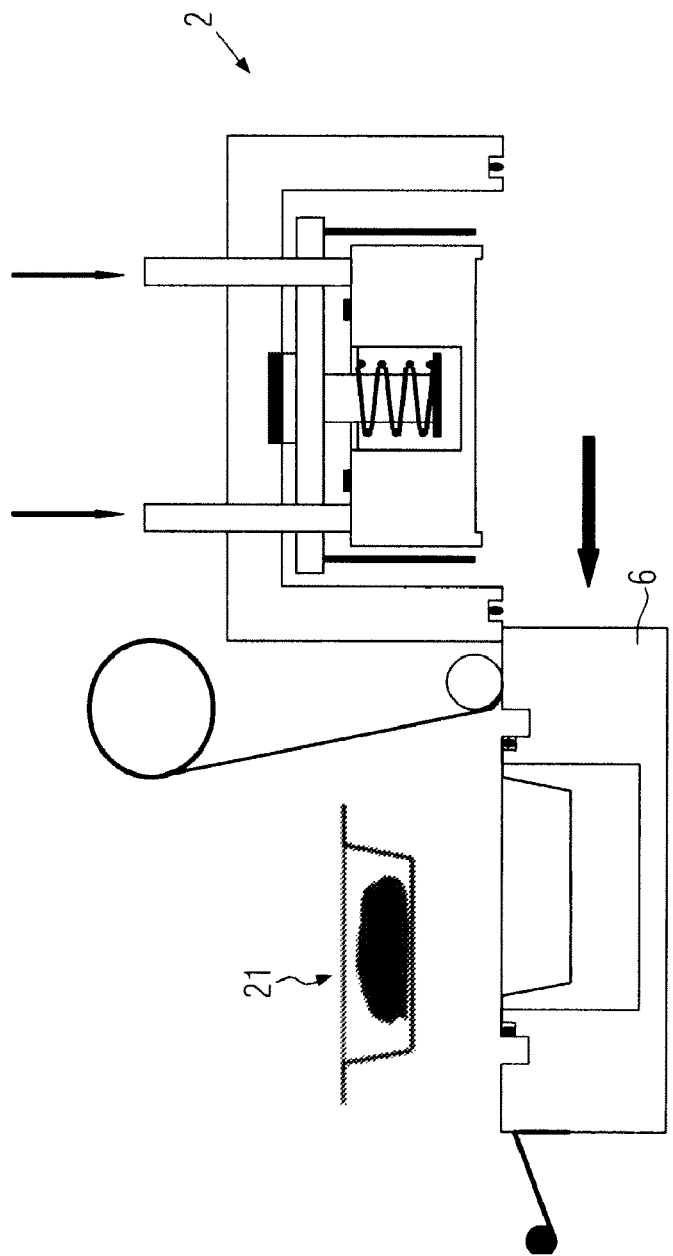
FIG. 7 is a schematic sectional view with extracted drawer.

FIG. 7 shows how the drawer 6 is extracted from the working station 2 in order to remove the package 21 and in order to make it possible to insert the next tray 7 that is to be sealed.

The electromagnet 11 or a permanent magnet can act directly on the cutting tool 12 or on a ferromagnetic material mounted thereon. A variant provides that the holding element 11 is mounted on the cutting tool 12 and acts on the sealing tool upper part 9.

Alternatively, the holding element can be a mechanical grid that is opened by means of the controller 5 and that independently locks into place in order to hold the cutting tool 12 on the sealing tool upper part 9.

In a further variant, it is conceivable that the top film 4 is cut by the blade 14 before the top film 4 is clamped against the tray 7 by the sealing frame 16 for sealing. This variant makes it possible for the top film 4 to be cut within the edge 15 of the tray 7 so that the package 21 can be further improved visually.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A working station for a packaging machine for sealing trays, the working station comprising:
    a sealing tool upper part;
    a sealing tool lower part;
    a sealing frame;
    a movable cutting tool having a blade for cutting a top film; and
    at least one energy storage device in operable engagement with the cutting tool and the sealing frame, said at least one energy storage device accumulating potential energy upon a relative movement of the sealing frame with respect to the cutting tool.

2. The working station according to claim 1, further comprising at least one holding mechanism capable of holding the cutting tool on a part of the working station that is stationary with respect to the cutting tool and the sealing frame.

3. The working station according to claim 2, wherein the holding mechanism is a permanent magnet or an electromagnet.

4. The working station according to claim 2, wherein the detachment of the cutting tool from the holding mechanism is provided by switching off the holding mechanism formed as an electromagnet via a controller or by means of exceeding the retention force of the holding mechanism by the sealing frame and the energy storage device.

5. The working station according to claim 1, wherein the energy storage device is a spring.

6. The working station according to claim 1, further comprising at least one cushioning element capable of cushioning the impact of the cutting tool against the sealing frame.

7. The working station according to claim 1, wherein said at least one energy storage device is configured to at least partially convert the accumulated potential energy into kinetic energy of the cutting tool in a movement of the cutting tool relative to the sealing frame and in a direction toward a package.

8. A method for operating a working station for a packaging machine for sealing trays and for cutting a top film, said method comprising:
   restraining a movement of a movable cutting tool with a holding mechanism;
   accumulating potential energy in at least one energy storage device by moving a sealing frame relative to the movable cutting tool; and
   releasing the holding mechanism to convert the accumulated potential energy into kinetic energy of the cutting tool.

9. The method according to claim 8, further comprising holding the cutting tool on a part of the working station that is stationary in comparison to the cutting tool and the sealing frame, and accelerating the cutting tool is in the direction of the top film by converting the potential energy accumulated in the at least one energy storage device into kinetic energy of the cutting tool.

10. The method according to claim 9, further comprising providing a cutting blade mounted on the cutting tool for cutting the top film on an edge of the tray.

11. The method according to claim 10, further comprising cushioning the cutting tool at the end of a cutting movement using at least one cushioning element.

12. A working station for a packaging machine for sealing trays with a top film, the working station comprising:
   a sealing tool upper part;
   a sealing tool lower part cooperable with the sealing tool upper part to form a sealing chamber;
   a sealing frame associated with the sealing tool upper part and movable relative to the sealing tool upper part;
   a movable cutting tool associated with the sealing tool upper part, the cutting tool having a blade for cutting a top film; and
   at least one energy storage device operably engaged with the cutting tool and the sealing frame, wherein the at least one energy storage device is disposed between the cutting tool and the sealing frame for accumulating potential energy upon a relative movement of the sealing frame with respect to the cutting tool.

13. The working station according to claim 12, further comprising at least one holder capable of holding the cutting tool on a part of the working station that is stationary with respect to the cutting tool and the sealing frame.

14. The working station according to claim 13, further comprising at least one holder capable of holding the cutting tool on the sealing tool upper part.

15. The working station according to claim 13, wherein the holder comprises a magnet.

16. The working station according to claim 15, wherein the magnet comprises a permanent magnet or an electromagnet.

17. The working station according to claim 15, wherein the cutting tool is selectively detachable from the holder by switching off the magnet via a controller or by exceeding the retention force of the magnet by the sealing frame and the energy storage device.

18. The working station according to claim 12, wherein the energy storage device comprises a spring.

19. The working station according to claim 18, wherein the spring comprises at least one of a compression spring or a torsion spring.

20. The working station according to claim 12, further comprising at least one cushioning element capable of cushioning the impact of the cutting tool against the sealing frame.

\* \* \* \* \*